United States Patent [19]

Mazdiyasni et al.

[11] 3,757,412
[45] Sept. 11, 1973

[54] LANTHANIDE ISOPROPOXIDES AND PREPARATION OF SAME

[75] Inventors: Khodabakhsh Mazdiyasni, Xenia; Leanne M. Brown, Brookville; Charles T. Lynch, Fairborn, all of Ohio

[73] Assignee: The United States of America as represented by the Secretary of the Air Force, Washington, D.C.

[22] Filed: Oct. 20, 1971

[21] Appl. No.: 191,127

[52] U.S. Cl.............. 260/429.2, 252/431 C, 252/441
[51] Int. Cl. .............................................. C07f 5/00
[58] Field of Search...................... 29/429.2, 429.1; 251/441, 431 C

[56] References Cited
UNITED STATES PATENTS

| | | | |
|---|---|---|---|
| 3,054,816 | 9/1962 | Rinse | 260/429.2 X |
| 3,278,571 | 10/1966 | Mazdiyasni | 260/429.2 |
| 3,356,703 | 12/1967 | Mazdiyasni | 260/429.2 |
| 3,634,476 | 1/1972 | Rinse | 260/429.2 X |

Primary Examiner—Stephen J. Lechert, Jr.
Attorney—Harry A. Herbert, Jr. et al.

[57] ABSTRACT

A process for preparing alkoxides of the lanthanide elements, such as lanthanum, cerium, praseodymium and neodymium, in high yields and at increased reaction rates, is provided by reacting a lanthanide element with isopropyl alcohol in the presence of a catalytic amount of mercuric iodide or a mixture of mercuric chloride and mercuric acetate.

13 Claims, No Drawings

LANTHANIDE ISOPROPOXIDES AND PREPARATION OF SAME

FIELD OF THE INVENTION

This invention relates to a process for preparing lanthanide alkoxides. In one aspect, it relates to a process for preparing lanthanide trisisopropoxides.

BACKGROUND OF THE INVENTION

A process for making alkoxides of yttrium, dysposium and ytterbium is disclosed by K. S. Mazdiyasni et al in U.S. Pat. No. 3,278,571. As disclosed in this patent, the isopropoxides are prepared by reacting one of the aforementioned metals with isopropyl alcohol under reflux conditions in the presence of mercuric chloride as the catalyst. While good product yields are obtainable when this prior art process is used to prepare isopropoxides of samarium through lutetium of the lanthanide series of elements, only low yields can be achieved in the preparation of isopropoxides of lanthanum through neodymium. Furthermore, the prior art process requires reaction periods that are exceedingly long.

It is an object of this invention, therefore, to provide an improved process for preparing lanthanide alkoxides.

Another object of the invention is to provide a process in which lanthanide isopropoxides are produced in high yields.

A further object of the invention is to provide a process in which lanthanide isopropoxides are produced at an increased reaction rate.

Still another object of the invention is to provide new isopropoxides of certain elements of the lanthanide series.

Other and further objects and advantages of the invention will become apparent to those skilled in the art upon consideration of the accompanying disclosure.

SUMMARY OF THE INVENTION

Broadly stated, the present invention resides in a process for preparing lanthanide alkoxides which comprises reacting an element of the lanthanide series with isopropyl alcohol in the presence of a catalytic amount of a catalyst selected from the group consisting of (a) mercuric iodide and (b) a mixture of mercuric chloride and mercuric acetate.

The reaction involved in the present process can be represented by the following equations:

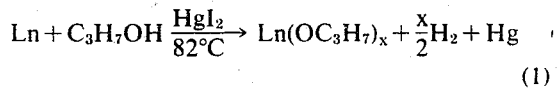

(1)

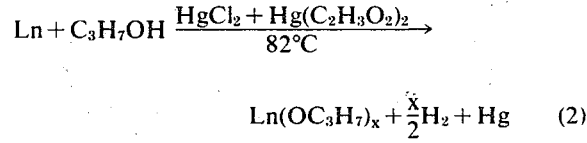

$$Ln(OC_3H_7)_x + \frac{x}{2}H_2 + Hg \quad (2)$$

In the equations Ln is an element of the lanthanide series, i.e., lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tu), ytterbium (Yb) and lutetium (Lu). The x in the equation is equal to the valence of the rare earth metal. It is to be understood that mixtures of the aforementioned rare earth metals can be used in the process in which event a mixture of isopropoxides of the metals is obtained as the product.

In another embodiment, the invention lies in the discovery that isopropoxides of certain elements of the lanthanide series can be prepared by the present process. These new isopropoxides can be represented by the formula $M(OC_3H_7)_x$, wherein M is a rare earth metal reflected from the group consisting of lanthanum, cerium, praseodymium, neodymium, samarium, europium, gadolinium, terbium, holmium, erbium, thulium and lutetium, and x is equal to the valence of the metal M.

It has been found that by carrying out the above-indicated reaction in the presence of the catalysts of this invention product yields as high as 75 percent and higher, based on the weight of the rare earth metal, are obtained. While comparable yields can be achieved with certain elements of the lanthanide series using mercuric chloride as the catalyst, with larger metal ions, e.g., lanthanum, cerium, praseodymium, and neodymium, yields in the neighborhood of only 20 percent can be attained. Furthermore, when using mercuric chloride as a catalyst, long reaction periods, e.g., 24 hours and longer, are required. While there is little, if any, improvement in reaction rate when using mercuric iodide as the catalyst, the reaction rate is greatly increased when conducting the reaction in the presence of a mixture of mercuric chloride and mercuric acetate. Thus, a reaction period of only about 8 hours, e.g., from about 7 to 9 hours, is required with the last-mentioned catalyst. Since higher yields and faster reaction rates result from the use of a mixture of mercuric chloride and mercuric acetate, this mixture is the preferred catalyst for use in the process of this invention.

In carrying out the process of this invention, it is important that the amount of catalyst used be only that necessary to catalyze the reaction. The use of too large amounts may cause contamination of the product with chlorine or iodine that are difficult to remove. Generally the amount of mercuric iodide that is employed is in the range of $1 \times 10^{-4}$ to $1 \times 10^{-2}$ mol per gram-atom of the rare earth metal. In the case of the mixture of mercuric chloride and mercuric acetate, the two compounds are preferably present in the mixture in a 1:1 weight ratio although there may be some small deviation from this ratio. Thus, the weight ratio of mercuric chloride to mercuric acetate can vary from 1.0:1.1 to 1.1:1.0. The amount of each compound of the mixture usually ranges from $1 \times 10^{-4}$ to $1 \times 10^{-2}$ mol per gram-atom of the rare earth metal.

The element of the lanthanide series that is to be used in the process is preferably in the form of thin metal shavings. As shown by the foregoing equations, stoichiometric amounts of the rare earth metal and the isopropyl alcohol are employed. The process is carried out under reflux conditions in an inert atmosphere, such as predried helium, nitrogen or argon, or under a vacuum. Thus, the reaction temperature is usually about 82°C, the boiling point of the alcohol, although higher and lower temperatures may be used depending upon the pressure in the reaction zone. Upon completion of the reaction, the isopropoxide product is separated from the reaction mixture by any suitable means, such as by filtration or by vacuum distillation. The product is then purified by dissolving it in hot isopropyl alcohol and then cooling the solution, thereby causing the isopropoxide to recrystallize as a purified product. This procedure can be repeated, if necessary, to increase the purity of the product.

The lanthanide isopropoxides prepared by the process of this invention are very pure, rendering them particularly useful as precursors in making high purity submicron oxide powders by thermal or hydrolytic decomposition. The rare earth metal oxide powders so prepared are employed in manufacturing dense, stable refractory, ferroelectric, piezoelectric, nuclear, laser, phosphor, and electrooptic type materials. The oxide powders are also useful in the stabilization of zirconium oxide, as absorbents and as catalysts.

A more complete understanding of the invention can be obtained by referring to the following illustrative examples which are not intended, however, to be unduly limitative of the invention.

EXAMPLE I

A series of runs was carried out in which lanthanum, cerium, praseodymium and neodymium isopropoxides were prepared. The runs of this example and those of examples described hereinafter were conducted in glass apparatus with ground-glass joints. Compounds were handled at all times in an inert atmosphere and were stored in an evacuated desiccator over calcium sulfate. The isopropyl alcohol used was reagent grade that was dried before use. The lanthanide elements were in the form of metal turnings that had an analyzed purity of 99.9 percent.

Each run was conducted by adding 5 grams of metal turnings and 5 milligrams of mercuric iodide to 300 milliliters of isopropyl alcohol. The reaction was carried out under a helium atmosphere at about 82°C. The reaction was refluxed for a period of 24 hours after which the reaction mixture was cooled and filtered. The product that was recovered was then purified by recrystallization from hot isopropanol. The yield of the final product in each run was about 70 percent. Chemical analysis indicated that the products were lanthanum, cerium, praseodymium and neodymium trisisopropoxides.

EXAMPLE II

A series of runs was conducted in which lanthanum, cerium, praseodymium and neodymium isopropoxides were prepared, utilizing a mixture of mercuric chloride and mercuric acetate as the catalyst.

Each run was conducted by adding 5 grams of metal turnings and a mixture of 5 milligrams of mercuric chloride and 5 milligrams of mercuric acetate to 300 milliliters of isopropyl alcohol. The reaction was carried out under a helium atmosphere at about 82°C. The reaction mixture was refluxed for a period of 8 hours after which it was cooled and filtered. The product that was recovered was purified by recrystallization from hot isopropanol. The yield of the final product in each run was about 75 percent. Chemical analysis indicated that the products were lanthanum, cerium, praseodymium and neodymium trisisopropoxides.

EXAMPLE III

A series of control runs were conducted in which lanthanum, cerium, praseodymium and neodymium isopropoxides were prepared, utilizing mercuric chloride as the catalyst.

Each run was conducted by adding 5 grams of metal turnings and 5 milligrams of mercuric chloride to 300 milliliters of isopropyl alcohol. The reaction was carried out under a helium atmosphere at about 82°C. The reaction mixture was refluxed for a period of 24 hours after which it was cooled and filtered. The product that was recovered was then purified by recrystallization from hot isopropanol. The yield of the final product in each run was about 20 percent. Chemical analysis indicated that the products were lanthanum, cerium, praseodymium and neodymium trisisopropoxides.

EXAMPLE IV

The runs of Example I, II and III were repeated except that samarium, europium, gadolinium, terbium, dysposium, holmium, erbium, thulium, ytterbium and lutetium were utilized in the preparation of rare earth metal isopropoxides. The yield of final product in each run was about 75 percent. When utilizing mercuric chloride and mercuric iodide as the catalyst, a reaction period of 24 hours was required to obtain this product yield. However, when a mixture of mercuric chloride and mercuric acetate was employed, a reaction period of only 8 hours was necessary.

From the data shown in the above examples, it is seen that the use of mercuric iodide or a mixture of mercuric chloride and mercuric acetate as the catalyst makes it possible to prepare lanthanum, cerium, praseodymium and neodymium trisisopropoxides in high yields. Furthermore, when using the latter catalyst, the reaction period required to obtain the products in high yields is greatly reduced. The data also demonstrate that the catalysts of this invention can also be used in the preparation of the other rare earth metal isopropoxides. While mercuric iodide as compared to mercuric chloride appears to offer an advantage only as to the synthesis of lanthanum, cerium, praseodymium and neodymium isopropoxides, the mixture of mercuric chloride and mercuric acetate, the preferred catalyst, provides unexpected results when used in the preparation of all rare earth metal isopropoxides, i.e., increased yield and/or shorter reaction times.

As will be evident to those skilled in the art, various modifications of the invention can be made in view of the foregoing disclosure without departing from the spirit or scope of the invention.

We claim:

1. A process for preparing an isopropoxide of an element of the lanthanide series which comprises reacting said element with isopropyl alcohol in the presence of a catalytic amount of a catalyst selected from the group consisting of (a) mercuric iodide and (b) a mixture of mercuric chloride and mercuric acetate.

2. The process according to claim 1 in which said element is reacted with said isopropyl alcohol in stoichiometric amounts under reflux conditions.

3. The process according to claim 2 in which said isopropoxide is separated from the resulting reaction mixture; the separated isopropoxide is dissolved in isopropyl alcohol; and the resulting solution is cooled, thereby causing the isopropoxide to recrystallize as a purified product.

4. The process according to claim 2 in which said element is reacted with said isopropyl alcohol in stoichiometric amounts in an inert atmosphere at a temperature of about 82°C.

5. As a new composition of matter, a compound having the formula $M(OC_3H_7)_x$, wherein M is a rare earth metal selected from the group consisting of lanthanum, cerium, praseodymium, neodymium, samarium, europium, gadolinium, terbium, holmium, erbium, thulium, and lutetium, and x is a numeral equal to the valence of the metal M.

6. The composition of claim 5 wherein M is lanthanum and $x$ is equal to 3.

7. The composition of claim 5 wherein M is cerium and $x$ is equal to 3.

8. The composition of claim 5 wherein M is praseodymium and $x$ is equal to 3.

9. The composition of claim 5 wherein M is neodymium and $x$ is equal to 3.

10. A process for preparing an isopropoxide of an element selected from the group consisting of lanthanum, cerium, praseodymium and neodymium which comprises reacting said element with isopropyl alcohol in stoichiometric amounts under reflux conditions in the presence of a catalytic amount of mercuric iodide.

11. A process for preparing an isopropoxide of an element of the lanthanide series which comprises reacting said element with isopropyl alcohol in stoichiometric amounts under reflux conditions in the presence of a catalytic amount of a mixture of mercuric chloride and mercuric acetate, the weight ratio of mercuric chloride and mercuric acetate in the mixture being in the range of 1.0:1.1 to 1.1:1.0.

12. The process according to claim 10 in which the amount of mercuric iodide is in the range of $1 \times 10^{-4}$ to $1 \times 10^{-2}$ mol per gram atom of said element.

13. The process according to claim 11 in which the amount of each compound in the mixture is in the range of $1 \times 10^{-4}$ to $1 \times 10^{-2}$ mol per gram-atom of said element.

* * * * *

UNITED STATES PATENT OFFICE
CERTIFICATE OF CORRECTION

Patent No. 3,757,412     Dated September 11, 1973

Inventor(s) Khodabakhsh Mazdiyasni, Leanne M. Brown, & Charles T. Lynch

It is certified that error appears in the above-identified patent and that said Letters Patent are hereby corrected as shown below:

Cover page, paragraph after "[73] Assignee:" should read --The United States of America as represented by the Secretary of the Air Force, Washington, D.C., of Leanne M. Brown's one-third interest.--.

Signed and sealed this 7th day of May 1974.

(SEAL)
Attest:

EDWARD M. FLETCHER, JR.
Attesting Officer

C. MARSHALL DANN
Commissioner of Patents